April 4, 1950          L. L. LYONS          2,502,734
EYEGLASS TEMPLE COVER
Filed Aug. 13, 1947
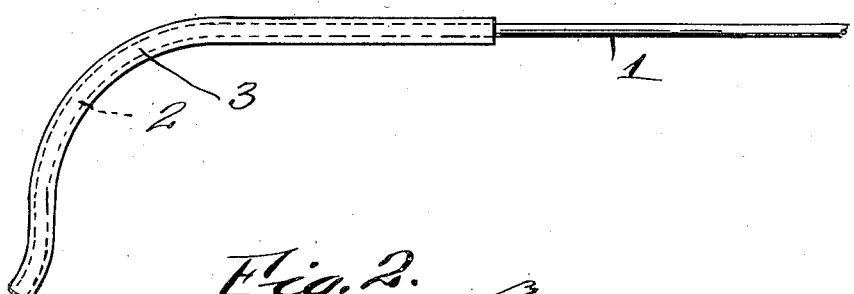
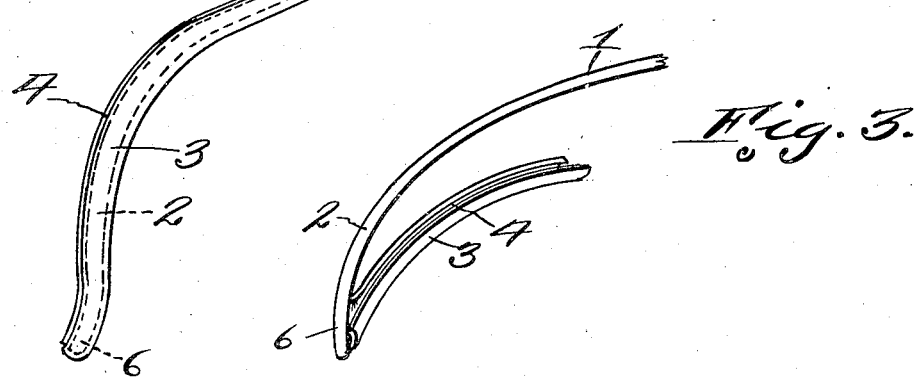
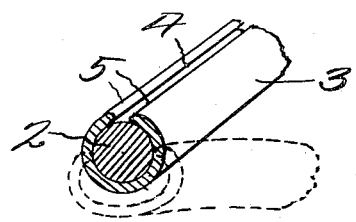
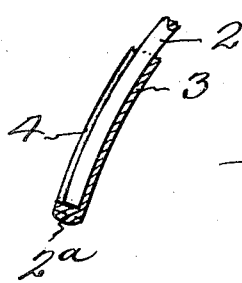
Inventor
Leon L. Lyons
By Philip A.␣␣␣␣␣␣
Attorney Patented Apr. 4, 1950

2,502,734

UNITED STATES PATENT OFFICE 2,502,734

EYEGLASS TEMPLE COVER

Leon L. Lyons, Culver City, Calif.

Application August 13, 1947, Serial No. 768,398

1 Claim. (Cl. 88—52)

The invention relates to eye glass temple covers, and has for its object to provide a device of this kind comprising an elongated tubular flexible member, preferably formed from a transparent plastic material, and having its outer side longitudinally slotted throughout its length, thereby forming a groove into which the temple piece can be progressively forced for snapping the device onto the temple piece.

A further object is to provide a flexible longitudinally slotted temple protector formed from flexible tubular material, and so constructed that it will receive temple pieces of various diameter.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the temple cover.

Figure 2 is a perspective view of the temple cover, showing the cover on the temple piece.

Figure 3 is a perspective view showing the method of snapping the cover onto the temple.

Figure 4 is a perspective view showing the temple piece and cover in transverse cross section.

Figure 5 is a modified form of the device.

Referring to the drawing, the numeral 1 designates the straight portion of a conventional temple piece of eye glasses, and 2 the rearwardly and downwardly extending ear engaging portions of the temple piece, which portion, on account of its small diameter, injures the ear of the wearer.

The protector comprises an elongated partially curved tubular member 3, preferably formed from a transparent material, to render the same inconspicuous. The protector 3 has its outer side provided with a longitudinal slot 4 throughout its length, and the edges of the slot 4 preferably rounded, as shown at 5 so it will easily snap over the curved portion 2 of the temple piece, as the temple piece is round, and its curved periphery will engage the curved edges 5 and easily spread them apart. In applying the device to the temple piece, the rear curved end 6 is forced into the rear end of the slot 4, as shown in Figure 3, and pressure is progressively applied to the protector along its length, from its rear end forwardly, until it has been completely snapped onto the temple. After the protector has been applied as set forth, the rear end of the temple and protector are bent outwardly, slightly, as shown in Figures 1 and 2, and this will positively hold the protector from longitudinal displacement. It will be seen that the protector enlarges that portion of the temple piece which engages over and behind the ear, consequently the present objection, incident to cutting of the ear by the small diameter temple pieces is obviated. It will also be seen that the device can be cheaply manufactured and sold.

Referring to the modified form shown in Figure 5, the lower end of the protector sleeve is closed as at 2a for preventing any upward creep of the sleeve on the temple piece.

The invention having been set forth what is claimed as new and useful is:

A laterally applied snap on temple piece cover comprising an elongated flexible sleeve adapted to cover the entire rear curved ear engaging portion of the temple piece, the outer side of said sleeve being longitudinally split from its inner end to a point adjacent the rear end of the temple piece thereby leaving an abutment for the end of the temple piece for preventing longitudinal creeping of the cover, said cover being tubular in cross section and flexibly and contractably gripping the periphery of the curved portion of the temple piece when the curved portion of the temple piece is forced through the longitudinal slit in the cover when laterally applying the cover to the temple piece.

LEON L. LYONS.

REFERENCES CITED

The following references are of record in the file of this patent:

UNITED STATES PATENTS

| Number | Name | Date |
|---|---|---|
| 2,031,771 | Grier | Feb. 25, 1936 |
| 2,117,466 | Welsh | May 17, 1938 |
| 2,294,840 | Dunn | Sept. 1, 1942 |
| 2,436,101 | Dirlam et al. | Feb. 17, 1948 |